United States Patent [19]

Miller

[11] 4,380,151
[45] Apr. 19, 1983

[54] BUOYANCY GENERATOR DEVICE AND METHODS OF MAKING AND USING THE SAME

[76] Inventor: Thomas C. Miller, 216 Antire Rd., High Ridge, Mo. 63049

[21] Appl. No.: 207,293

[22] Filed: Nov. 17, 1980

[51] Int. Cl.³ .............................................. F03C 00/00
[52] U.S. Cl. ...................................... 60/496; 60/495
[58] Field of Search ................... 60/495, 496, 639, 398

[56] References Cited

U.S. PATENT DOCUMENTS 233,319 10/1880 Boerner .................................. 60/639
3,360,926 1/1968 Parr ........................................ 60/496

FOREIGN PATENT DOCUMENTS 56052 10/1912 Austria ................................... 60/496

*Primary Examiner*—Allen M. Ostrager
*Assistant Examiner*—Stephen F. Husar

[57] ABSTRACT

The present invention relates to an energy conversion device for converting stored liquids and potential energy into rotational and kinetic energy, which is provided with a plurality of ballast tanks disposed about a wheel in a ferris-wheel manner with each tank alternately filling with and discharging liquid at the top and bottom of its travel.

1 Claim, 2 Drawing Figures

BUOYANCY GENERATOR DEVICE AND METHODS OF MAKING AND USING THE SAME

BACKGROUND OF THE INVENTION

Conventional techniques for generating energy are being tested by the current demand for energy in view of the limited supply.

SUMMARY

It is therefore an object of the present invention to provide a buoyancy generator device which utilizes a plurality of ballast chambers operably mounted upon and disposed about a wheel in ferris-wheel fashion in combination with means for alternately filling the chambers with liquid and air.

A further object of the present invention is to provide such a device which is simply and economically manufactured and used.

These together with other objects and advantages which will become subsequently apparent, reside in the details and construction and operation as more fully hereinafter described and claimed, reference being had to the accompanying drawings forming a part hereof, wherein like numberals refer to like parts throughout, and in which:

DETAILED DESCRIPTION OF THE INVENTION

Figure 1:
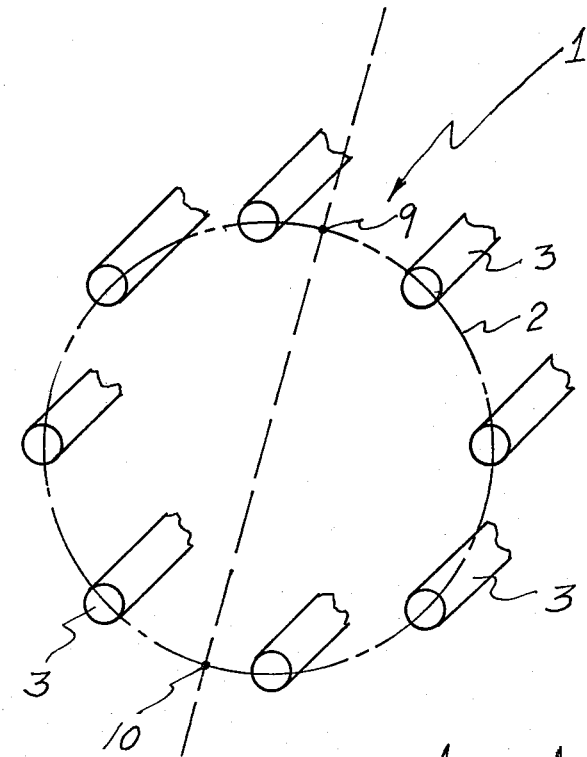
FIG. 1 is a functional perspective view of a portion of a buoyancy generator device constructed in accordance with and embodying the present invention.

Referring now in more detail and by reference characters to the drawings which illustrate practical embodiments of the present invention, FIG. 1, is a functional perspective view of a buoyancy generator device 1, constructed in accordance with, used in and embodying the present invention.

Figure 2:
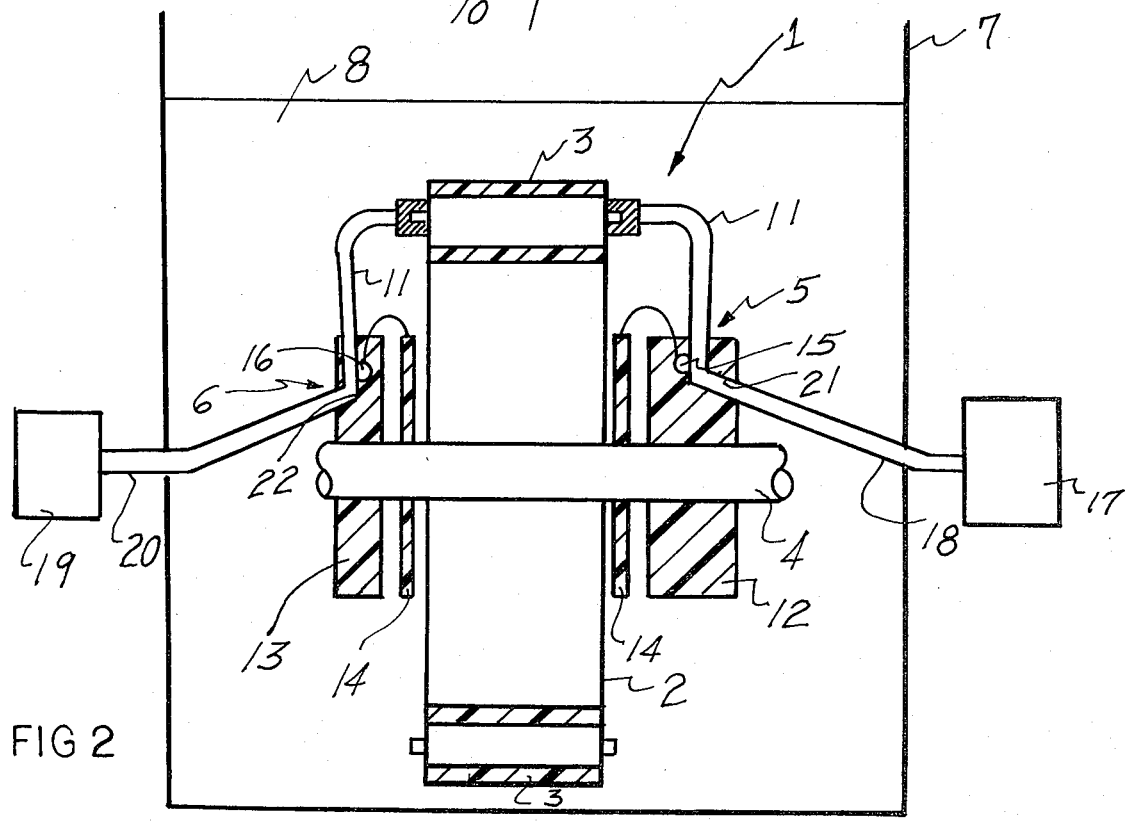
FIG. 2 is an elevation cross view of a buoyancy generator constructed in accordance with and embodying the present invention.

As shown in FIG. 1, and FIG. 2, buoyancy generator device, 1, comprises wheel 2, upon which are mounted ballast chambers 3, in combination with pivotal mounting shaft 4 and air injection means 5 and liquid injection means 6, all mounted in tank 7 containing liquid 8.

As illustrated functionally in FIG. 1, it is contemplated that the chambers 3 will be mounted on wheel 2 and disposed thereon in ferris-wheel fashion. It is assumed in FIG. 1, that the device rotates in a clockwise direction. In such a mode the chambers 3 will be filled with water at the water insertion point 9 and filled with air at the air injection point 10.

The means for injection of water 6 and air 5 are shown in greater detail in FIG. 2. In the preferred embodiment the various chambers are serviced by lines 11 from air distributor 12 and water distributor 13 which are controlled by position indicating devices 14, which electrically controls valves 15 and 16. Air is supplied from source 17 via line 18 and liquid is supplied from source 19 via line 20.

Distributors 12 and 13 are provided with individual passages 21 and 22 and lines 11 for each chamber 3.

It should be understood that changes and modifications in the form, construction, arrangement, and combination of the buoyancy generator device and methods of making and using the same may be made and substituted for those herein shown and described without departing from the nature and principle of my invention.

Having thus described my invention, what I claim is new and desire to secure by United States Letters Patent is:

1. A buoyancy generator comprising an energy conversion device for converting stored liquids and potential energy into rotational and kinetic energy comprising, wheel means, rotatably mounted and submerged in a body of liquid, closed rigid storage chambers operably mounted in said wheel means and disposed about the periphery thereof, downward motion assistance means comprising fluid insertion means operably mounted proximate the uppermost part of said wheel means and adapted to fill each chamber with fluid as it reaches its highest point of travel, upward motion assistance means comprising fluid extracting and air injection means operably mounted proximate the lowermost part of said wheel means and adapted to empty each chamber of fluid as it reaches its lowest point of travel and thereby increase each chamber's buoyancy.

* * * * *